United States Patent [19]

Buchanan et al.

[11] 3,845,472

[45] Oct. 29, 1974

[54] DATA COMMUNICATION SYSTEM EMPLOYING A SERIES LOOP

[75] Inventors: Stuart R. Buchanan, Mequon; Paul H. Froehling, Franklin; Gary F. Oman, Greendale; Thomas W. Huebner, New Berlin, all of Wis.

[73] Assignee: Johnson Service Company, Milwaukee, Wis.

[22] Filed: Dec. 15, 1972

[21] Appl. No.: 315,567

[52] U.S. Cl. .............................. 340/163, 340/147 R
[51] Int. Cl. .............................................. H04q 9/00
[58] Field of Search......... 340/409, 163, 147 R, 413

[56] References Cited

UNITED STATES PATENTS

| | | | |
|---|---|---|---|
| 3,689,887 | 9/1972 | La Falce | 340/409 X |
| 3,716,834 | 12/1973 | Adams | 340/409 X |
| 3,735,396 | 5/1973 | Getchell | 340/409 X |

*Primary Examiner*—Harold I. Pitts
*Attorney, Agent, or Firm*—Andrus, Sceales, Starke & Sewall

[57] ABSTRACT

A serial data communication loop system has a stored program computer capable of performing the sequences of internally stored instructions and also modifying those instructions as directed by those instructions. A loop controller includes the computer and generates timed spaced multiple bit message frames for serial, time spaced communication with a plurality of remote stations, each of which has one or more functional point modules. The multiple bits of frames are functionally grouped to provide in sequence a remote address byte, a module address byte, a command and status byte and a data and load selection byte. Each frame bit is immediately processed and transmitted to the next remote, either modified or unmodified in accordance with the system response without local synchronization generators or the like for simultaneously processing the several remotes. Each remote has a frame generator responsive to failure to receive a message frame within a given time to generate frames with its own address to signal the controller of a loop break. An operator console has a manual input means and output display means for selective communication with the other remotes under control of the loop controller. The display means includes individual status lamps for each remote as well as common display means selectively related to any one of the remotes. A plurality of loop system controllers connected to a central processing unit provide expanded capabilities.

50 Claims, 4 Drawing Figures

DATA COMMUNICATION SYSTEM EMPLOYING A SERIES LOOP

BACKGROUND OF THE INVENTION

The present invention relates to a data communication system employing a series loop connecting a plurality of communication stations such as in the monitoring and controlling of environmental conditions.

Automated communication systems interconnecting remote units or locations with a central station are widely employed in processing of information and the monitoring and controlling of various pieces of equipment and means. Processing of the control data and the like advantageously employs computers which can rapidly service a very large number of low speed, input-output remote units at remote stations as terminals. The remote terminals can be selectively and in sequence connected to a single central computer means for sequential communication with the computer. For example, in heating, ventilating and air-conditioning systems for buildings and the like, computers have been employed to provide a continuous remote monitor and control of various instruments and operating machinery. Generally, such systems provide communication between a central operator station and the remotely located instruments and devices to provide a continuous and rapid indication to the building operator of any abnormal conditions as well as to permit variations of the controls in accordance with changing conditions. Such systems also preferably permit automatic print-out or other recording of the system operation.

Various communication systems have been developed including hard wired systems wherein the various remote devices were directly connected through individual wiring to the central location with means for selectively operatively interconnecting the hard wired units into the control. Subsequently, relay and of the various controls; for example, as shown in U.S. Pats. No. 3,300,759 and 3,396,379. Computer scanning systems have also been developed to provide for high speed, periodic sampling of the several inputs. Generally, the computer will scan a single point, however, and must obtain the data before moving on to a subsequent point. More recently, serial loop control and communication systems, such as shown in U.S. Pat. No. 3,639,904, have been suggested where the communication between a central station and a plurality of remote stations is established on a connecting loop. The central computer station generates a series of communication time slots or blanks which are serially fed in timed synchronization through the several remote stations and back to the central station, with coded means providing for introducing and removing of information at the respective stations. Such systems must, however, provide for means to insure the integrity of the system operation and in order to be applicable to heating, ventilating and air-conditioning systems, must be constructed to permit generalized data transfer such as required in the management of the building systems as well as the continuous monitoring and controlling of such system. Such system must control and respond to various forms of electrical signals, and devices including analog signal means, contact closure means and various on-off equipment with contact and status means. Thus, the input-output device may employ a set of contacts or other switching means provided for starting, stopping and status signalling of a device. In processing systems, the set point may be adjusted and analog signal information may be desired to be retrieved from a remote point. Further, each remote station will normally employ a plurality of such relatively low speed response and transfer equipment which can be grouped functionally for control and monitoring purposes. In addition, the system must be adapted to employing the more conventional type of peripheral equipment such as teleprinters, graphic display devices, keyboards and the like.

SUMMARY OF THE PRESENT INVENTION

The present invention is particularly directed to a generalized serial data communication system employing a stored program computer for operating of an associated terminal connecting loop. The present invention particularly employs a stored program computer which is not only capable of performing the sequence of internally stored instructions, but is further capable of modifying those instructions as directed by those instructions.

Thus, in accordance with the present invention, a loop includes a loop controller connected via a single communication cable in series to a plurality of loop remote stations. The latter include the hardware or load means for the actual control of the systems, such as the heating, ventilating and air-conditioning of an associated environment and also various types of input and output devices which permit communication with the loop controller by receipt and transfer of information to and from the loop. In accordance with the present invention, the loop controller basically functions to generate timed spaced information frames which do not heed start and stop signals nor time synchronization. These signals are serially fed through the loop and again received by the loop controller, where information inserted by a remote station is interpreted and verified as to the system operation. The remote stations are capable of initiating information transfer to the loop as a result of internal changes as well as receiving information from the loop and providing a controller operation within the remote station. The loop controller within the remote station. The loop controller preferably includes auxiliary input-output devices to allow program loading, program generation and operator communication directly from an additional computer means which may be time shared with other equipment and other loop systems to form a master and submaster system. Thus, a plurality of information loops can be interconnected through a suitable scanning system to a more powerful central location computer at a central station. The loop controller may, of course, in connection with a central computer system, be instructed through a software instruction system. This may be desirable where provision of the capabilities of a main computer at the loop controller would unduly complicate a single loop and degrade or reduce performance efficiency.

The remote stations can be enlarged or reduced with respect to associated peripheral devices as required within system limits.

Generally, in accordance with the present invention, the loop controller generates the message or information frames as a series of frames, each spaced in time with respect to successive frames. Each of the frames includes a plurality of information bits serially generated at a very rapid rate; for example, a rate of 500,000 bits per second. The time spacing generates quiet periods which distinguish the starting and stopping of frames. The bits within each frame are functionally grouped to provide at least an address group, a command group, data group and station condition group.

As the frames are received by a remote station, each bit is processed and responded to immediately and then transferred to the next station, either modified or unmodified in accordance with the system response. Each bit generates a clock signal which is employed to retransmit the data bits to the next loop element. There is, therefore, no synchronization of clock and data signals within the loop remote stations. Thus, the signal bits are continuously transferred through the serial loop and the frames are simultaneously processed in the remote stations, although any one station will always be processing a different bit in such frame at any given instant.

In processing and operating controls and particularly heating, ventilating and air-conditioning controls for building and building complexes, the several remote stations will normally include a plurality of various basically different functioning devices which may form different common function groups. In accordance with one aspect of the present invention, a remote station is provided with one or more functional point modules which are adapted to couple and interface such basically similar equipment and response devices to the loop under the control of a frame handling or processing logic means.

Communication between the point modules and the frame handling logic means or module is provided through a common bus system interconnecting all of the point modules to the frame logic system to minimize the time for communication. Thus, the first module may provide sensing of the contact condition for any one or a plurality of contact means within the remote station. A different module may be provided for providing multiple operation on a single device, such as the start and stop as well as the reading of the status of the control device. Each multiple bit information or message frame contains the remote station address means, a point module address means, and command information means to instruct a particular module or a particular point within the module as to the type of operation to perform and transfer means for such point module. At least some of the point modules will have the capability of requesting a message frame in which to transmit information due to a change in one or more of its inputs. Generally, as there will be a plurality of point modules at any given station, the point module is wired to create a priority basis in the servicing of requests from the several point modules as by the physical routing of the electrical connections between the several point modules.

Generally in accordance with a preferred and novel construction of the present invention, particularly as applied to heating, ventilating and air-conditioning systems, each of the information frames is divided into at least four subdivisions or bytes of mutliple bit information. The first byte includes a looped remote station address as well as a frame status input. Thus, the frames are generally classified as a null frame which removes the frame from the system. A dedicated frame, which includes a specific address within the loop, and an available frame to receive information from a remote station. The latter frames may be further subdivided into a generally available frame which can be captured or interrupted by the first remote station encountered which includes a request or interrupt signal for provision of the transmission of information from the station. Alternatively, an available frame may be related to particular remote station. The latter is desirable to override the natural priority existing in the system as a result of the remote station location in the serial loop. The loop controller can be programmed to control the available frame technique through a suitable application program in accordance with the particular functions or circumstances of any particular system which may dictate its necessity. Generally speaking, the frequency of the generally available frames is sufficiently rapid to service all requests within the required time limitations.

In a preferred construction, the first byte will identify the character of the frame as well as the particular remote address where required. A second byte of the frame will provide address to any one of the particular family of point modules associated with the remote station. The third byte provides for a commanded operation to the addressed module and receiving basic status information from the remote station. The final or fourth byte is reserved as a data group for the transmission of information or the receipt of information from an active point module. The data may include selection of a particular point within a module and analog information and the like where required. Each of the frame bytes includes a parity bit or bits to insure the integrity of system operation.

In accordance with a further aspect of the present invention, the availability and priority rating of the frames are controlled by the three sequential initial bits of the first byte. The normal first logic state indicating that it is a generally available frame. Changing of the logic signal by a remote station automatically removes it from subsequent processing and relates it to the activating remote station. That station will then fill in the rest of the frame with the proper information. A specific or an available frame which has been specified by the loop controller for a particular station will have the normal available logic first bit in the normal state, but the second bit will have an alternate logic signal indicating that the frame has been assigned to a particular remote station, the address of which occurs in the subsequent bits of the first byte. That frame is then only available for the corresponding remote station and will be filled by the corresponding station if it in turn has generated a signal requesting a frame into which it is desired to introduce information. This then provides a means of overriding a normal priority system.

The third bit of the first byte provides for the selective simultaneous setting of all of the remote stations into an active state. This permits sending of a common command and/or data to selected remote point modules at all stations. Data cannot, of course, be received as only a single remote station can introduce data into a given frame.

The second byte includes a pair of initial acknowledgment bits. Thus, a first acknowledgment is introduced into the frame where an activated remote station has recognized its address. The frame is thus transmitted through the loop to the loop controller which interprets the bit as a positive response by the proper remote station. The second acknowledgement bit is employed to indicate that a remote station is filling an available frame. The balance of the second byte provides for point module addressing.

In addition, each dedicated frame from the loop controller must be acted upon, not only by the remote station, but also by the selected point module to inform the loop controller that such response has been made. The responding point module generates an acceptance signal within the point module to indicate response to the address. If the acceptance signal is not generated, the commanded portion of the third byte is converted into a selected condition such as all logic "O's" indicating the failure of the response. The loop controller recognizes such commanded condition as a failure to respond.

Further, it is important to indicate the operative status of each of the remote stations. Status bits are provided following the command bits of the third byte for detecting the condition of the remote station. One bit indicates a parity failure in an activated remote station. A second bit provides a continuous monitoring of the condition of the local power supply necessary to the remote station operation. A third bit is set by a remote station to request a frame and thereby inform the loop controller of the requirement for an available frame or an acknowledging frame.

The preferred construction includes means which insures that information is properly transmitted and received by the loop controller and that there is no loss of information by preventing of the remote units from clearing an interrupt condition until the loop controller has determined that in fact information has been properly transmitted. Thus, if the transmission has an error, retransmission of the frame by the loop controller is possible. However, if a filled available frame from a loop remote station has been received with an error, loss of information is possible if the interrupting or transmitting point module has cleared its request or interrupt status. In the preferred construction, all point module interrupt devices are cleared only upon receipt of a dedicated frame with a command thereto to clear. Thus, if a filled available frame is not received error free by the loop controller, the latter will merely ignore the frame and the point module will subsequently fill another available frame and will continue to do so until properly acknowledged by a dedicated frame from the loop controller.

A voltage monitoring system also provides for automatic bypassing of the remote station by directly interconnecting of the input cable to the output cable if a local power supply necessary to loop communication fails. The station is automatically restored to the loop in the event that the particular type of power failure is corrected. A manual switching means may also be provided for selective bypassing of a remote station. This permits testing and servicing procedures without effecting the normal operation of the remainder of the loop.

Further, it is essential to continuously monitor the continuous transmission capability or completion of the loop. Thus, if the loop is broken as by a cable connection component failure or the like which does not provide for automatic bypassing, the communication system is, of course, inoperative. Where there is a significant number of stations, it is important to be able to identify rapidly the location of the failure. The loop controller asynchronously generates message frames as dictated by the stored program. However, in accordance with an aspect of this invention in a preferred construction, there exists a maximum interval between successive frames which will never be exceeded. Each of the remote stations includes a monitoring means to check the interval between frames and if an excessive permissible interval arises, the remote station downstream of the broken cable will detect the excessive interval. That remote station will then function to continuously generate frames and introduce a unique address. The loop controller, upon receiving successive frames with the single address, can readily detect, locate and pinpoint the location of the brake at least with respect to a pair of successive remote stations.

The address selection means and the various interlocking control means are such that the loop controller recognizes and distinguishes a problem in loop operation. A parity error resulting from noise or the like may, as a result of the computer stored program reject such erroneous information and repeat the operation in which the error occurred. If the system corrects itself, the error is not indicated. If the failure repeats at a rapid rate, however, a decrease in system performance will be readily indicated to the operator. Where a permanent type failure has occurred, however, such as component failure or power failure, a message appropriately describing the problem is generated to permit corrective measures to te taken.

Each of the loop systems can also be provided with a battery powered real timeclock for continued system operation in the event of a power failure.

Further, in such systems it is highly desirable to provide a remote loop element which can provide for operator control remote from the loop controller or communication between remote stations and the loop controller. In accordance with a further aspect of the present invention, a portable operator console of a standardized design is provided for application in a family of system loops under the control of the associated loop controller. The console is insertable in series in the selected loop. The console has a specific unique address for the family of loop systems in which it can be employed. The console responds to a group of fixed point module addresses under the control of the stored program in the loop controller of the loop in which it is inserted. Communication is originated between the devices either due to changes at a remote station or as a result of specific operator request at the operating console. The console includes means for display of conditions and values either by visual, audio or similar outputs and permits operator entry of data and parameters to be transmitted to and from various other remote stations through the loop controller, including modification of the operation of the loop controller. The operator thus is provided with means for requesting and displaying of monitored values, alarm limits or the like. The operator is also permitted to introduce control functions such as variation or changes in the set point, the starting and stopping of certain components such as motors. An auxiliary audio communication is also preferably provided under the control of the operator with an automatic audio alarm signal in response to creation of alarm conditions at any particular station.

In a particularly novel construction the operator console is constructed with a control panel containing indicating lamps or the like for producing status monitoring of each of the remote stations. Each indicator lamp is adapted to be in any one of the three states including on, off or blinking. Off indicates a normal condition, while an on light indicates an abnormal condition. The blinking light indicates an abnormal condition which has not been acknowledged by the console operator. Thus, the panel will further include switch means for acknowledging a fault at one or more remote stations. In addition, the console provides a numeric display of data and/or time with additional lamps provided to indicate the type of data being displayed from analog type variables and still additional lamps provided to indicate the display of non-analog functions.

Manually operated address switch means are provided for introducing addresses into the system for selection of particular remote stations, point modules and equipment within a point module. Function switches permit introduction of a numeric code into a message frame for particular operations such as display, parameter entry and the like. Input value switches are also provided to permit direct entry of four decimal digital information. An indicating means is also associated with the numeric display means to indicate whether or not the particular related condition or point module is in a normal status or alarm.

The operating console initiates communication with the loop controller through any one of three execute switches including a transmit or interrupt switch which requests an available frame which will be filled by the operator console through the actuation of the address and function switches. Actuation of the switch results in an available frame being filled with the operator's console address which is transmitted to the loop controller which, in turn, generates a subsequent group of frames which read the entries on the data switches. The actuation of an acknowledgment switch results in the conversion of the blinking indicators to a steady state, and where used removal of the audio alarm.

In addition, the operator console is provided with a special jack conforming to EIA Standard RS—232—C and an internal optional circuit module within the operator console to permit interconnection of devices conforming to such standards. This is particularly desirable to permit operation of devices such a teleprinters, slide projectors or the like which may be provided as an accessory to the operator console. Thus the operator console may be employed as an operator in a communication system permitting communication with the loop controller and the loop remotes and may be employed as a single back-up unit for any one of a plurality of loop systems in an installation having multiple loops.

Applicants have found the present invention provides a very versatile system which can be particularly applied to heating, ventilating and air-conditioning systems or the like processing controls where the remote station will normally have selected interrelated devices which can be functionally grouped into particular types of input-output devices.

BRIEF DESCRIPTION OF DRAWINGS

The drawings furnished herewith illustrate a preferred construction of the present invention in which the above advantages and features are clearly disclosed as well as others which will be readily understood from the subsequent description of such illustrated embodiment.

In the drawings.

DESCRIPTION OF ILLUSTRATED EMBODIMENT

Figures 1, 2:
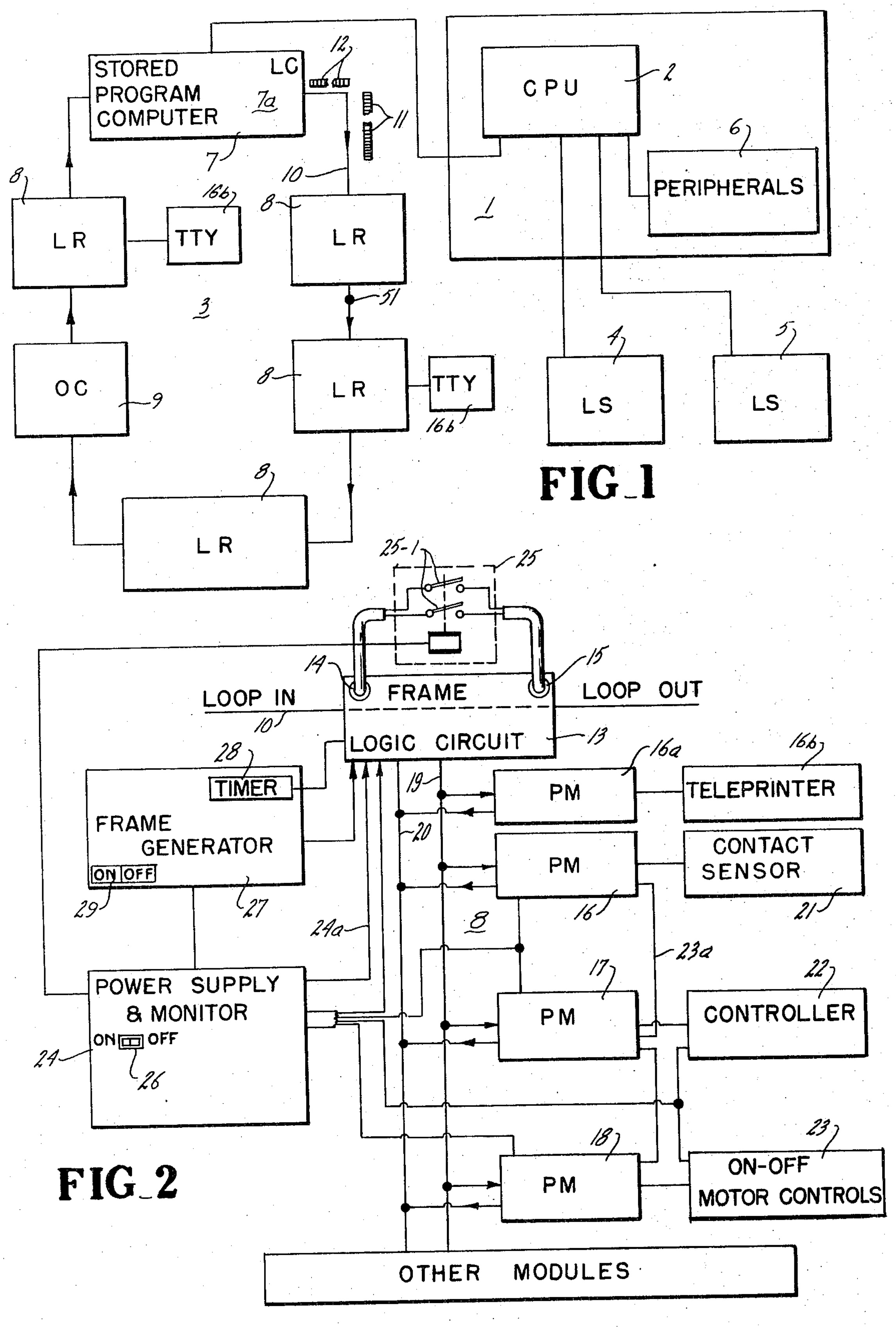
FIG. 1 is a block diagram of a general data communication system employing a plurality of interconnected similar loop systems connected to a central computer center.
FIG. 2 is a diagrammatic illustration of a remote station shown in FIg. 1 and illustrating the basic components thereof.

Referring particularly to FIG. 1, a data communication system is illustrated wherein a main computer center 1 is provided and includes a computer unit 2 which is selectively connected in a time sharing manner to a plurality of loop systems 3, 4 and 5 as well as to other peripheral devices such as teletype writers 6 or the like. The main central computer station 1 thus controls through a suitable sequencing or scanning system, a plurality of different devices and systems. Each of the remote loop systems 3 through 5 are separately formed as self-contained communication loops and the loop 3 is shown in expanded block diagram. The loop system 3 includes a loop controller 7 establishing a programmed operation of a plurality of similar remote stations 8 as well as an especially constructed remote console station 9, and all of which are interconnected to the loop controller 7 in a series loop by a common transmission cable 10. The loop controller 7 includes a stored program computer 7A which is capable of performing sequences of internally stored instructions and furthermore is particularly capable of modifying those stored instructions as directed by the instructions and the circuit programming. The stored program computer 7A can also be provided with suitable input-output device connections for manually controlling the operation or can be interconnected through the central computer 2 to communicate with it. The computers and related signal processing hardware may be any one of the known means available in the multiplex and binary signal processing art and specific detailed circuits and elements would unduly complicate the illustration and description and are not, therefore, generally included.

The loop controller 7 includes a means for serial transmission via the cable 10 of time spaced information or message frames 11 and 12, each of which is divided into a series of binary signal bits, identified by the conventional symbols as at a logic "0" or "1," for communication between the loop controller 7 and the several remote locations 8 and 9. A preferred, novel construction of an information frame 11 or 12 is more fully described hereinafter in connection with FIG. 3, but each frame generally provides for selective coupling to any one of the remote stations 8 – 9 for transmission of information or data to or from such stations and the loop controller 7. The loop controller 7 thus constitutes the originator of each frame and the final destination of each frame and automatically interprets any information received from a remote station as well as verifies that each message frame has received a proper response, and finally controls clearing of an activated remote station for subsequent communication. In addition to providing for the data transmission between the several stations, visual or other human operation communication between stations or from stations to the loop controller can be provided through the use of suitable interfacing devices such as a teleprinter device at the loop controller and/or one or more of the remote stations 8 – 9.

Although any two-wire system can be employed to transmit the data between several elements in a series manner, a coaxial cable 10 is particularly satisfactory to provide the desired data rate over the desired transmission distances required for heating, ventilating and air-conditioning systems. The several remote stations may be separated by distances of 2,000 feet from each other without using repeaters. The loop system can interconnect from one to 31 remote stations as well as a portable operator console. Thus, a relatively long loop cable results. The transmitting and receiving is preferably through a suitable system to establish high noise immunity and DC isolation of the several elements in the loop. Thus a particularly satisfactory coupling and decoupling circuit is particularly shown in the copending application of Thomas W. Huebner entitled "CONVERSION OF PHASE DEPENDENT SIGNALS TO CLOCKED DIGITAL SIGNALS FOR LOOP COMMUNICATION SYSTEMS," which was filed on the same day as this application and is assigned to the same assignee. This system provides for a transformer coupling of balanced bi-polar data bits at both transmitters and the receivers of the respective station elements.

Each plurality of bits or positions defining a message frame 11 is transmitted as a series of immediately adjacent equal time slots with each of the frames separated by a substantial time as diagrammatically shown by the spacing between the frames 11 and 12 in FIG. 1. The frames are generated asynchronously from the loop controller 7 in accordance with the stored program but under all conditions at a minimum rate such that the spacing between subsequent frames is at a selected maximum interval.

The message frames 11 and 12 are thus transmitted over the cable 10 to the first loop remote station 8, which analyzes and transmits the bit in serial fashion through the remote station to the next succeeding remote station.

Each of the remote stations is generally constructed, in a preferred embodiment, as diagrammatically illustrated in FIG. 2. The remote station 8 includes a frame handling logic system or unit 13 having an input terminal 14 connected to receive the frame bits from cable 10. The logic circuit 13 analyzes each bit and transmits it, either modified or unmodified depending upon the status of the bit and its relationship to the total programmed control. Thus in the loop system each frame is simultaneously being processed by each of the remote stations, with a one bit delay per remote station and with each remote station, of course, processing or analyzing a different bit in the total frame.

Thus, the analyzed bit is transmitted via an output terminal 15 for retransmission to the next succeeding remote station. The frame handling logic unit 13 in processing a message frame recognizes whether it is directed to that station or otherwise available to that station and, if required, provides for the necessary processing within its station.

Each remote station 8 further includes a plurality of functional point modules or devices 16 – 18 generally referred to and indentified by the labeled "PM" blocks in FIG. 2, as well as a special module 16A which controls a teleprinter device 16B. Three point modules 16 – 18 are diagrammatically illustrated with a common bus connection to unit 13 via a common input bus 19 and a common return bus 20. The message frame signals, when appropriate, are simultaneously impressed upon each of the modules, one of which is activated and impresses the return information on common return bus 20 to the frame logic handling circuit 13 for introduction into the message frame 11.

The point modules may provide for coupling of functionally similar equipment to the loop. For example, point module 16 may provide interface between contact sensor 21 which, when activated, senses the condition of one or more sets of contacts and transmits the information to controller 7. A particularly satisfactory contact sensing circuit is shown in the copening application of L. J. Strojny, et al, entitled "STATUS SENSING AND TRANSMITTING CIRCUIT," which was filed on the same day as this application and is assigned to the same assignee. The point module 17 is shown as an interface between a suitable controller 22 which may, for example, provide for automatic control of a set point. The third module 18 is shown as a start-stop control with status sensing which may provide a means to control the stopping and starting of a motor as well as providing a feedback signal indicating the status of the motor. A particularly satisfactory motor control circuit module is shown in the copending application of L. J. Strojny entitled "REMOTE CODED DUAL STATE CONTROLLER APPARATUS." Other typical controls which are desirable provided in a heating, ventilating and air-conditioning systems include an analog signal select module or an analog to digital converter module such as shown in the copending application of Strojny entitled "ANALOG SIGNAL TRANSMISSION SYSTEM FOR DIGITAL COMMUNICATION SYSTEM" and a peripheral interfacing device which conforms to EIA standard BS—232—C for interconnecting of peripheral equipment such as the teleprinter 16B for communication between local remotes with the loop controller. All of the applications referred to herein were filed on the same day as this application and are assigned to the same assignee. The equipment associated with the modules is such that in some cases informacion may be obtained from the message or information frame 11 or 12 which insructs the point module to complete or perform a particlar operation in accordance with selected data which is transmitted to the module, or to transmit information back to the loop controller 7. Further, since more than one of the point modules 16 – 18 might request a frame and thus generate a control signal on the common bus 20, the point modules 16 – 18 include an interlock line 23a to provide a continuous physical routing of the electrical connections between the point modules and the common bus and thereby provide for a priority selection.

In addition, each remote station 8 includes a power supply and monitoring system 24 coupled to the several point modules 16 – 18, the frame logic unit 13 and the operating load or hardware means 21 – 23 to provide for a continuous monitoring of the several power supplies. Some of the power supplies such as that for unit 13 are essential to loop communication while others are non-essential with respect to communication and only relate to the operation of a particular point module, piece of equipment or the like. Failure of one or more of the non-essential voltages is sensed at the power supply monitor and transmitted over unit 24A to a message frame 11 to record and inform the loop controller 7 of the failure, as more fully developed hereinafter. A failure of an essential voltage for proper loop communication automatically actuates a switch means 25 which disconnects and bypasses that remote station. For example, as diagrammatically illustrated, the power supply monitor 24 is connected to actuate a relay 25 at such switch. The relay has a pair of contacts 25-1 directly interconnecting the input terminal 14 to the output terminal 15 and thereby directly baypassing the remote station 8. When a related power malfunction is corrected, the relay 25 will automatically restroe the remote station 8 to the loop. A switch 26 in each of the remote stations 8 provides for manually disconnecting the loop cable 51 from the remote station logic and connecting the loop cable past the station. This permits convenient testing and servicing procedures which can be conducted within the remote station 8 without affecting the normal operation of the remainder of the loop system. A voltage monitor is shown in the copending application of Chacon entitled "MULTIPLE VOLTAGE MONITORING APPARATUS."

In addition, each remote station 8 includes a frame generating means 27 connected to unit 13 and responsive to an open loop condition on the input side thereof for establishing an output through the frame logic handling unit to signal the loop controller 7 that the break appears immediately in front of the particular station 8. The open loop identification unit is a frame generator 27 which contains the unique address of the particular remote station 8. The generator 27 includes an input timer 28 connected through the frame logic hanlding unit 13 to continuously monitor the interval between successive frames 11 and 12. If the interval exceeds the permissible maximum interval, the generator 27 is actuated to generate frames containing the corresponding address. Within a very short period only the remote station 8 which has not been receiving frames as a result of the immediately preceding open loop condition generates frames. The loop controller, through the successive receipt of the corresponding remote station address, is able to rapidly identify such station and provide a corresponding output. The generator 27 may also have a manual disconnect switch 29 to permit loop operation at a slower frame rate.

In summary, each of the remote stations 8 generally is provided with a plurality of basic functional point module means which are interconnected through a common bus connection to the frame logic handling circuit 13. Further, each of the remote stations provides means to detect fault conditions within the station and to provide an interrelated control and reporting of such condition so as to prevent interruption of the loop operation or a continuous undetected malfunctioning.

Returning to a description of the message frames 11 and 12 and the normal processing thereof, each includes a plurality of multiple bit bytes or subsections related to the proper addressing of the several stations and modules as well as providing for commands and readout of the information at the several remote stations. A particularly satisfactory and novel construction of a suitable message frame is shown in FIG. 3.

Referring to a description of the message frames and the normal processing thereof, each includes a plurality of multiple bit bytes or subsections related to the proper addressing of the several stations and modules as well as providing for commands and readout of the information at the several remote stations. A particularly satisfactory and novel construction of a suitable message frame is shown in FIg. 3.

Figure 3:
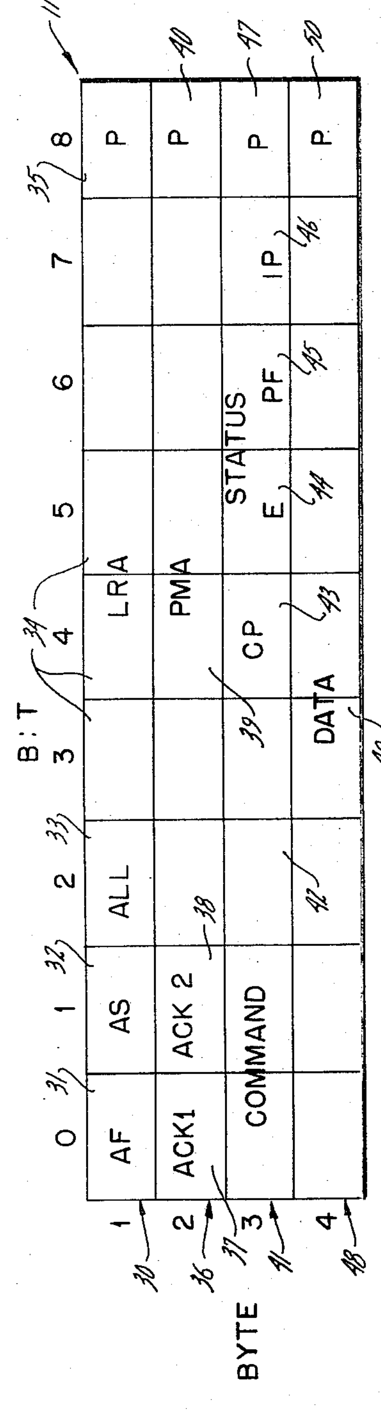
FIG. 3 is an illustration of the modular organization of a message frame employed in the illustrated data communication system.

Referring particularly to FIG. 3, a single message frame 11 is shown in a modular block format. The total frame 11 consists of 36 successive immediately succeeding bits divided into four basic bytes, each of which includes nine bits identified respectively by the digits as bits "0" through "8." Each bit position in each byte is a digital binary logic signal identified by either a high or low voltage level in accordance with the usual binary logic system and identified as a logic "0" or a logic "1." The logic signals are sequentially transmitted as described with the "0" bit of the first byte 30, shown in FIG. 3, being transmitted through the system and immediately following thereafter by the bit "1" etc.

The first byte 30 identifies the frame type and loop remote address code means which provides for recognition of an assignment and availability of the interrelated frame to the remote stations 8 – 9. If the message frame 11 is assigned to a remote station 8, the unit 13 recognizes the address message and activates the corresponding station for modification of the message or data bits. If the frame is not addressed to the particular station, the several sequentially received bits are merely retransmitted without modification to the next station.

Each of the message frames 11 and 12 may be any one of three types, identified as a "Null" frame, a "Dedicated" frame or an "Available" frame. The condition of the frame is generally identified by the first three bits 31, 32 and 33 of the first byte 30. A "Null" frame includes all logic "0" in bits 31, 32 and 33 of byte 30 and throughout the frame and is usually transmitted to prevent information inflow from the loop. A "Dedicated" frame includes a specific address in a plurality of address bits 34 with specific control command. The unit 13 recognizes each address and activates the station 8. A "Dedicated" frame is, therefore, specifically assigned to a particular remote station 8 and point modules 16 – 18 therein, with a particular commanded operation for such module.

"Available" frames are circulated through the loop and available to a remote station 8 which desires to transmit information to the central station or loop controller 7. Such "Available" frames may be generally available and selected by the first remote station encountered which has a request pending status. Alternatively, a specific or assigned "Available" frame may be generated by the loop controller 7, which is then restricted to receiving information from only the specified remote station which is addressed in the first byte. This permits the loop controller 7 to create a priority system, if necessary. Such latter frame will, of course, accept information from any one of the point modules 16 – 18 within the remote station 8, as addressed. A generally "Available" frame is generated with a logic "1" in bit 31.

As this type of frame 11 circulates about the loop between the several stations, each bit is sequentially analyzed by the appropriate remote station and the first remote station which has a request or interrupt signal pending converts the initial bit 31 to a logic "0" and further fills the balance of the frame with the desired information. The conversion of the first bit 31 to a logic "0" removes the generally "Available" frame characteristic of the frame and makes it unavailable to the remainder of the remote stations.

If an "Available" frame has been restricted by the loop controller to a particular loop remote, a logic "0" remains in the zero bit 31, whereas the second or the one bit 32 includes a logic "1." The third through seventh bits 34 of the first byte 30 constitute the particular remote station address when assignment of such frame has been specified.

In the illustrated embodiment, five bits, 3 through 7, are provided for addressing of the several remote stations 8 – 9 in either a "Dedicated" or an assigned "Available" frame 11, the system being arranged to accommodate 31 remote stations 8 as well as the operating console 9.

An assigned "Available" frame can only be captured by the designated remote station 8 by inserting a message to be transmitted to the loop controller 7. The number two bit 33 of the first byte 30 is in "all" bit which will simultaneously activate all remote stations 8. This is established by maintaining the logic "0" in the first two positions and establishing a logic "1" in the third or all bit 33. The fourth through the eighth bits must be logic "0" to allow the loop remote to respond. Finally, the first byte 30 includes a final parity bit 35 which will ensure the integrity and proper transmission of the first information byte 30.

The second byte 36 of the frame 11 includes a pair of acknowledgment bits 37 and 38 immediately generated for the sequential transmission and retransmission following the parity bit 35. The first acknowledgment bit 37 of the second byte 36 is changed to a logic "1" by the remote station 8 in response to recognition by the remote station of its address in bits 34 and conditioning of the remote station 8 for response.

The second acknowledgment bit 38 is converted to a logic "1" by a remote station 8 – 9 which is filling a message frame 11 or 12 which has been circulating as an "Available" frame.

The second byte 36 then includes six successive address bits 39 and a final parity bit 40. Bits 39 include the address for any one of the point modules 16 – 18 associated with a remote station 8 and thereby provides a coded interlock for activating a particular point module. The next byte 41 includes a plurality of command bits 42 in the initial byte portion.

If the addressed point module 16 – 18 does not recognize its address or respond properly, an acknowledgment signal is not generated.

If it does not do so, the command bits 42 of byte 41 are transmitted as a continuous logic "0." The loop controller 7 upon receiving of such a "Dedicated" frame recognizes all "0" in the command bits as a failure of the addressed point module to respond to the frame 11. The loop controller 7 can then recirculate a new message frame with the appropriate command, or provide any required output signalling. In the illustrated embodiment of the invention, the third byte 41 includes the initial four bits 42 for introducing the desired command to the particular point module and thereby encoding the type of operation or function to be carried out at that particular point module.

The frame handling logic unit 13 applies the four command bits via the bus 19 to all point modules 16 – 18 but only the activated point module can respond to such coded command signal and set the module for the desired operation.

A command parity bit 43 immediately follows the bits 42 and must check the message frame properly before the command signal is transmitted in the addressed module.

The third byte of the message frame 11 finally includes in sequence three status bits 44, 45 and 46 and a final parity bit 47.

The status bits 44 – 46 are activated or filled by a remote station 8 to advise the loop controller 7 of selected conditions at said station. Bit 44 is associated with a detected parity error in the processing of a frame. The detection of any one of the above parity errors prevents the activated point module from performing the commanded operation as introduced by the command bits 42. In this condition the remote station 8 is in a semi-active mode and it only functions to fill the status bits 44, 45 and 46 and advise the loop controller 7 of such condition.

The second status bit 45 is associated with failure of the power supplies of the activated remote station 8. As noted in connection with FIG. 2, all of the power supplies are continuously monitored by unit 24. If the power supply is not essential to the remote station functioning on the loop as such but is essential to the proper operation of the point module, bit 45 is set to a logic "1" to transmit this information to the loop controller upon a failure. If the power supply is essential to the operation of the remote station on the loop, the switch system or circuit, as shown in FIg. 2, removes the remote station to permit continued operation of the loop system.

The final status bit 46 is activated by a remote station 8 to indicate that an interrupt condition exists and that a frame is required for sending of data to controller 7. This information is received by the loop controller 7, interpreted appropriately that an unacknowledged interrupt exists in an active remote station which requires an "Available" frame or a final acknowledging frame to permit clearing of the interrupt Thus, whenever a remote station 8 is activated, either by the controller 7 or by an internal request to send a message, the interrupt condition can only be cleared by receiving of a "Dedicated" message frame from the loop controller 7 with an appropriate clear command in the command section 42. This is desirable to ensure against protection of loss of information. If an error in the nature of a parity error, a drop bit or the like occurs, the loop controller 7 will recognize such condition and retransmit a frame for subsequent filling. If a filled "Available" frame, however, is not received error free by the loop controller 7 and the point module 16 – 18 which had filled such frame had been allowed to drop its interrupt, there would be a possible loss of information. The loop controller 7 therefore controls clearing or resetting of the interrupt and will do so only if a filled "Available" frame has been received error free. If it is not so received, the loop controller 7 will simply ignore the erroneously filled or acted on frame and the point module 16 – 18 will subsequently obtain and fill another "Available" frame and will continue to do so until properly acknowledged by a "Dedicated" frame.

The eighth or final bit 47 of byte 41 is a parity bit which functions to ensure the integrity of the information system.

The final byte 48 includes eight data bits 49 followed by a final parity bit 50. The final byte 48 is also employed to transmit data to the activated point module 16 – 18 to select a particular point or piece of equipment and/or to receive information therefrom in accordance with the command condition which was transmitted to a point module 16 – 18. An activated point module may thus include a logic means activated from the point module addressing and status checking to further activate only one of the several points within a unit 21 – 23.

The message frame 11 is thus processed bit-by-bit in the logic unit 13 and, where appropriate, by a point module 16 – 18 and associated hardware 21 – 23. The bits are then retransmitted in modified or unmodified form in a manner which maintains reliable reading, interpretation and analysis by controller 7. The multiple parity checks wherein a remote station 8 can only be activated and can only activate the internal elements under proper parity to perform a commanded operation constitutes one means of assuring valid information transmission. The parity checks in combination with the positive acknowledgments, the power failure and status checks, provide a combination means whereby the loop controller 7 is informed essentially immediately of an existence of a problem in the loop transmission system. Where the error is of an instantaneous nature such as a parity error, the loop controller stored program can readily be set to reject the erroneous information and repeat the operation to correct the error. If the frequency of the problem reaches a significant level, the system's performance will degrade and become apparent to the operator. Where the error is not of an instantaneous nature and, in essence, self-correcting, but of a more permanent nature such as a component or power failure, a positive signal is generated describing the problem to the operator so that appropriate action can be taken.

Thus the system provides a complete asynchronous digital transmission system which can be expanded or contracted to fit various application requirements. The separate stored program computer at each loop controller is particularly desirable in that the program can be modified by the internal instructions of the stored program and is readily adapted to software programming. Further, the several remote stations can communicate with each other through the loop controller 7. For example, the teleprinter 16B may receive and transmit information to the loop controller. The teleprinter 16B may, therefore, include instructions which modify the operation of the loop controller. The capability of transmitting and receiving coded information also permits communication between teleprinters 16B or the like at different remote stations 8, for example as shown in FIg. 1.

The various point modules and associated devices can be selectively positioned in a most advantageous arrangement with the necessary information grouped and collected during the operation of the system. The continuous monitoring of the transmission and operating integrity of the system with built-in means for diagnosing the circuit system and indentifying system faults is particularly desirable when applied to controlling of remote hardware.

In a data communication loop system, an open loop condition may occur and it becomes important to be able to locate the position in the loop at which the fault has been established.

In accordance with the illustrated embodiment of the invention, each remote station 8 is similarly constructed with the frame generator 27 having the capability of generating a series of message frames in timed delayed sequence.

For example, in the operation of the normal loop system, the loop controller 7 may typically have the capability of generating information bits at the rate of 500,000 bits per second. The 36 bit frames 11 and 12 are thus generated in timed sequence at this rate with quiet periods between successive frames of at least 10 microseconds. The total minimum frame generation rate, however, will be typically never less than several thousand frames per second. Thus, the frames 11 and 12 will not, under proper operation, be separated by a period which exceeds, for example, 200 to 500 milliseconds. Each remote station 8 – 9 should correspondingly receive successive frames without a delay or interruption exceeding 500 milliseconds. The special frame generator 27 which contains its own address continuously monitors the time delay between successive remote message frames. If the period exceeds a selected level such as 500 milliseconds, indicating the failure to receive successive frames in the normal minimum manner, the frame generator 27 begins to repetitively generate frames containing its own address. For example, in a practical application, 7,700 frames per second may be generated and the generator continues to do so until an input is detected by its receiver circuit through a suitable logic circuit. Each of the fault frames so generated is transmitted to all succeeding remote stations. Thus, assume a break occurred at point 51 between the first and second receiving remote stations 8. Conditions on the output or transmit end of the loop controller 7 and the first remote station 8 are normal and, consequently, the loop controller 7 will continue to generate frames 11 and 12 and the first remote station 8 will continue to process and transmit such frames. There is no data flow, however, throughout the remainder of the loop to the loop controller. After a selected timing period, such as 200 ms or more, during which time the loop controller 7 will have received no frames, the second remote station 8 begins generating its own frames. The loop controller 7 receives and reads such successive frames at its inputs with the address of such one remote station indicating the presence and location of the fault condition. The loop controller 7 may then generate an appropriate message indicating the location of the fault as well as the type of fault on any suitable operator communication device such as a teleprinter or the like.

Upon correction of the cable fault condition, the second remote station 8 which is downstream of point 51 receives a bit through the previously broken cable from the first remote station 8. The first bit received terminates the operation of the signal generator 27 and resets the station 8 to again continuously monitor the time between successive frame signals. The reset remote station 8 does not immediately retransmit the following bits of the resetting frame. When a subsequent frame, however, is received from the first preceding remote station, the reset remote station is in the normal receive and transmit mode to again complete the normal operation of the loop. The recovery sequence permits the remote station to return to the normal operation without misinterpreting such data or transmitting it as erroneous data.

This also ensures that the station 8 immediately downstream of the break point 51 is recognized by the controller. Thus, some other downstream stations 8 may have a shorter timing peiod than others at the moment a break occurs and a station on the downstram side of the loop from that immediately adjacent the break may generate frames containing its address to the loop controller. However, a very short period thereafter the frame generator 27 adjacent the break would be activated. When the further downstream station receives a bit from the upstream station, it would, of course, terminate its own frame generation and await the start of the next succeeding frame from the upstream station. Thus even though the timing period in a downstream device might be shorter than that immediately located adjacent the fault, the timing and reset systems automatically ensure that the station 8 immediately downstream of the fault is operative to activate the loop controller 7 to generate the proper address.

This feature of the invention thus provides an accurate and rapid fault identification means which does not require any calibration procedures or adjustments in the sensing network with respect to the position of the equipment in the loop system. Thus each remote station responds regardless of its position in the precise same manner to provide proper identification at the loop controller.

In loop control systems, it is highly desirable to have a back-up operator means in addition to a loop controller 7 which will permit the manual introduction and removal of information as well as selective monitoring of the several remote stations. The illustrated operator console 9 is particularly constructed and provided to produce such functions and controls. The various elements, once again necessary to the actual functioning, are readily available and will be readily understood by those skilled in the art and consequently the main input-output devices are diagrammatically illustrated in FIG. 4 and the connections described as follows.

Figure 4:
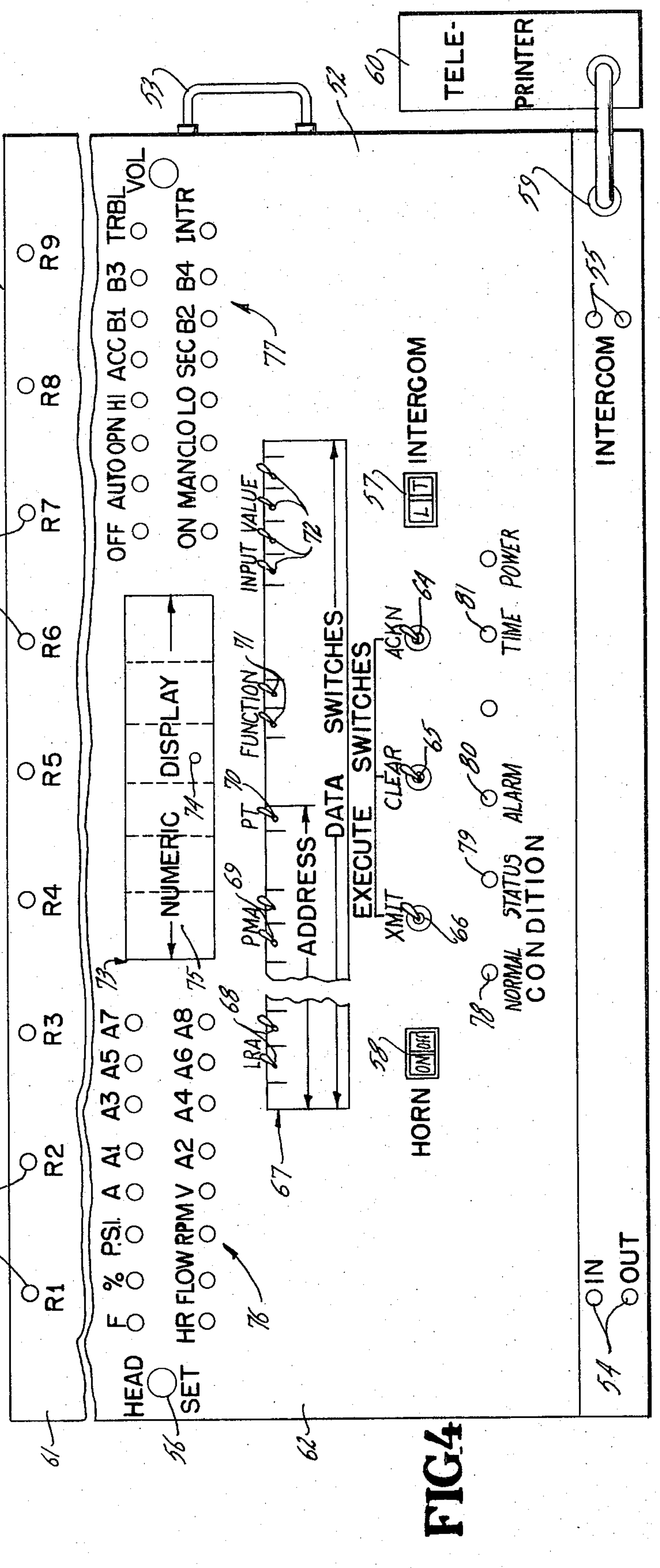
FIG. 4 is a view of an operator console showing the various input-output elements for operation of the console in association with the loop communication system shown in FIGS. 1 and 2.

In FIG. 4 a preferred construction of an operator console system is illustrated wherein an outer portable housing 52 is provided for completely housing all of the necessary control equipment and may be provided with a suitable fold out handle 53 or the like to permit convenient movement and transportation to the desired location in the loop. Input-output terminals 54 are provided in the housing for interconnecting of the loop cable 10 to station 9. In addition, the operator console includes auxiliary communication terminals 55 for connection in a special sound cable connected to the several stations 8. The communication system permits audio discussion between the operator at the operator console and any one of the remote stations as well as providing an audible alarm of detected errors at the remote stations. A headset jack 56 may be provided and a listen-talk switch 57 selectively conditions the circuit for corresponding receiving or transmitting an audio message. The intercom system may also include a horn or other audible alarm source, not shown, for responding to a detected alarm condition in the system. An on-off control switch 58 may be provided to selectively connect the audible alarm into the system. The console 52 is also provided with an internal power means and the like for self-contained operation and includes one auxiliary equipment jack 59 for interrelated control of peripheral equipment.

In particular the operator console 52 includes internal connection means for accepting optional modules via jack 59 in accordance with EIA standard RS—23-2—C. This feature allows a device such as a teleprinter 60, a slide projector or the like to accompany the operator console 52 and be controlled from the loop controller. The teleprinter 60 permits communication with local remotes through the loop controller and modification of the loop controller operation.

The operating console 52 includes essentially all of the elements provided at a conventional remote station including a frame handling logic circuit with a remote station address recognition circuit coded to a fixed loop address of all logic zeros, and responsive to selected point module addresses for routing of the information within the operator console. Thus, the station 9 defined by the operator console 52 is formed of a standard configuration rather than variable as are stations 8 which are adapted to particular or peculiar input-output devices at the particular remote stations as such.

In addition to the standard processing circuitry, the operator console 52 is provided for message initiation transactions through the loop controller 7 in response to changes in the input of any loop remote station or in response to a specific operator request generated at the operator console 52.

Generally the operator console 52 includes a front viewing wall with an upper enunciating panel 61 and a lower selection input and display panel 62.

The upper panel 61 contains a plurality of lamps 63 each appropriately labeled and corresponding to a particular remote station 8. Thus where the system is adapted to control 31 remote stations, 31 indicator lamps 63 would be provided. Each of the lamps 63 is individually controlled by the message frames 11 directed to station 9 and thus the operator console 52, by the loop controller 7 and may be placed in any one of the three conditions, such as steady off, steady on or blinking, in order to establish a continuous indication of the condition at the monitored remote station. Thus, if a remote station 8 has an abnormal input or condition, the corresponding lamp 63 will be placed in a blinking status indicating this condition and further indicating that the operator at the console 52 has not acknowledged such condition. The alarm condition is acknowledged by the console operator by actuation of an acknowledgment switch 64 in the lower panel 62. Switch 64 establishes an interrupt signal to transmit an acknowledgment signal to controller 7 which then transmits a lamp-change signal to the console. Upon acknowledgment, the lamp 63 will revert to a steady on condition. This system is cleared of all blinking lamps 63 in response to actuation of an acknowledge switch 64 by the console operator which causes generation of an appropriate frame from the loop controller 7.

The lower panel 62 includes the execute switches 64, 65 and transmit switch 66. The operator at the console 52 may thus initiate communication by actuation of any one of three switches shown as three illuminated push button switches 64 – 66, labeled "X-mit," "clear" and "ACKN." Each of the switches 64 – 66 is effected to generate a request or interrupt signal for selection of an "Available" frame and inserting of the operator console's address therein. This is transmitted to the loop controller 7 which generates a subsequent group of "Dedicated" frames under a stored program for the operator console 52.

A group of data switches 67 which can be manually set by the operator of the operator console are further provided for introduction of binary coded information into a message frame 11 or 12. In particular, the group of switches 67, of which only a portion are shown, include remote station address switches 68, point module address switches 69 and an internal point switch 70 for selection of a particular hardware within the point module. Additionally, a command or function code to be carried out at that address is set by function switches 71 of group 67, which are set into a numeric code for a particular operation which may include display, control and/or parameter enter functions.

Entry of data to a remote station is accomplished by input value switches 72 which provide for introduction of up to four decimal digits into any given point.

Operation of the "X-mit" switch 66 will cause the console to capture an available frame, insert its address therein and result in the loop controller 7 generating a series of "Dedicated" frames to the console to read the several entries on the group of data switches 67.

The lower display panel 62 also includes a numerical display section 73 in which it is possible to introduce numeric information in any one of a plurality of different formats, including a movable decimal point or field separator location 74. To the leftmost end of the numeric display section, a minus sign indicator 75 may be provided for appropriate actuation. The numeric display is operated through the use of a group of three message frames directed by the loop controller 7 to the operator console 52 with the necessary numeric information coded therein as to value, decimal or separation point location and minus sign information.

The numeric display 73 is flanked on opposite sides by a plurality of indicating lamps 76, 77 which are used to indicate the type of numeric information being presented. Thus, the lamps 76 to the left side of the numeric display 73, for example, may be associated with selected engineering units such as temperature, percentages, flow pressures and the like to indicate what the numeric display indicates with respect to an analog type variable. If a non-analog function is being displayed, the lamps 77 to the right side of the system will indicate the corresponding meaning to be given to the numeric information for the non-analog function.

At the bottommost portion of the panel, a plurality of indicators 78, 79 and 80 are provided to introduce additional information regarding the system information present in the numeric display. The three lamps 78 – 80 may indicate a normal or alarm status of the point associated with the numeric display 73 while lamp 81 may be illuminated to indicate that the time of day is being presented. An auxiliary display lamp may be employed for selective interconnection if a special function or element is associated with the operator console such as a teletype writer or the like.

Actuation of the "clear" switch 65 will send a signal to the loop controller 7 to direct a frame to the operator console 52 to remove the information from the selection display panel 73 to the operator console 52 to remove the information from the selection display panel 73 indicator lamps 76, 77, indicators 78, 79, 80, and introduce the time of day in selection 73, with a corresponding illumination of the time lamp 81.

Because of its standard design and the various means by which it is connected into the system, the station 9 and particularly console 52 may be connected into any one of a plurality of the loop systems 3 – 5 to provide an operator control at a location remote from the controller or as a back-up operation for the controller.

The present invention thus provides an improved data loop communication system particularly adapted for operation of remotely located operating and information gathering hardware which can be functionally grouped as in heating, ventilating and air-conditioning systems as well as other industrial process controls.

Various modes of carrying out the invention are contemplated as being within the scope of the following claims, particularly pointing out and distinctly claiming the subject matter which is regarded as the invention.

We claim:

1. A data communication loop system wherein a plurality of remote stations are coupled to a central control station by a serial transmission path means, each of said remote stations being adapted to receive multiple bit code signals and to transmit said signals to a succeeding station, each of said remote stations including a plurality of load means which are divided into functional groups defined as point modules, comprising a frame code signal generator forming a part of said control station and adapted to generate a continuous series of time spaced data frames separated in time, each of said frames having at least three bytes including an initial frame status and address byte including frame status bits and a subsequent plurality of loop remote station address bits, a second multiple bit byte having acknowledgment bits and a subsequent plurality of point module address bits for selection of remote monitored means, and a third multiple bit byte having a plurality of command bits and operating data bits for execution of selected operations of the load means within a point module.

2. The data communication loop system of claim 1 wherein said third multiple bit byte includes a first byte having a plurality of command bits and a plurality of subsequent status bits to identify the status of a remote station, and a second multiple bit byte for transmission of data to and from a remote station including load selection means for selection of at least one load means within the point module.

3. A data communication loop system wherein a plurality of remote stations are coupled to a central loop controller station by a serial transmission path means, each of said remote stations being adapted to receive multiple bit code signals and to transmit said signals to a succeeding station, each of said remote stations including a plurality of load means which are divided into functional groups defined as point modules, comprising a frame code signal generator forming a part of said controller station and adapted to generate a continuous series of time spaced data frames, each of said frames including a plurality of multiple bit bytes each including a final parity bit and including a first address byte having first and second bits identifying generally available frames and assigned available frames, a third bit identifying frames assigned to all remote stations for transmission of a common command and having a plurality of loop remote station address bits, said frame including a second multiple bit byte having first and second acknowledgment bits actuated by a remote station and a plurality of point module address bits for selection of remote monitored means, a third multiple bit byte having a plurality of command bits and including a command parity bit, a second plurality of status bits to identify the status of selected conditions at a remote station, and a fourth multiple bit byte for transmission for data to and from a remote station including point selection means.

4. The data communication loop system of claim 3 wherein each remote station includes means responsive to failure of a point module to recognize its address in a frame to actuate the next byte bits to a unique logic state and to retransmit such frame to the controller with such unique logic state, said controller responding thereto.

5. The data communication loop system of claim 4 wherein all of said command bits are placed in a logic "0" to indicate such failure.

6. The loop communication system of claim 3 wherein each remote station includes means to set one of said acknowledgment bits of the second byte in response to receipt of a "Dedicated" frame with a corresponding station address, each point module having acknowledgment means to generate a point acknowledgment signal in response to receipt of its address, said frame handling means having means connected to said acknowledgment means to transmit the command bits as logic "0's" in the absence of receipt of said point acknowledgment signal.

7. The data communication loop system of claim 3 wherein each remote station includes means to actuate one of said acknowledgment bits of said second byte in response to station actuation by a "Dedicated" frame for said remote station, and to actuate the other of said acknowledgment bits in response to engaging of an "Available" frame for filling of such frame.

8. The data communication loop system of Claim 3 wherein the status bits of said third byte includes a parity error bit operable to prevent execution of a command and to advise the loop controller of the status, a power failure bit to advise the loop controller of a selected power failure at a remote station, and an interrupt bit to inform the loop controller of a frame pending request.

9. The data communication loop of claim 3 wherein said fourth byte includes initial bits each of which is related to one of a plurality of load means at a multiple load means point module.

10. The data communication loop of claim 3 wherein said fourth byte includes bits which are related to data input and output means.

11. The data communication loop system of claim 3 wherein each remote station includes a multiple voltage supply means establishing a plurality of operating voltages to the several associated point modules and frame handling means, said voltages being divided into first voltages essential to remote station operations and to second voltages essential to loop communicating, and monitoring means for said voltages and operable to by-pass the remote station in response to a voltage fault in a second voltage and coupled to the frame handling means to set one of said status bits and transmit a fault message to the controller in response to a voltage fault in a first voltage.

12. The data communication loop system of claim 11 wherein each remote station includes an input cable means and an output cable means for receiving and transmitting the digital information in serial form, and said monitoring means including switch means connecting said input cable means directly to said output cable means and responsive to said second voltages to complete the connection.

13. In a data communication loop system having a central station coupled to a plurality of remote stations in a 4 continuous series loop, wherein said central station includes a loop controller constructed to generate a continuous series of spaced multiple bit message frames, each of said remote stations including a frame logic handling means having an input cable means to receive said frames and an output cable means to retransmit each frame, said frame handling logic means including means to analyze each bit as received regarding the applicability of the frame to the corresponding station and responsive to the next succeeding bit to transmit such bit modified or unmodified in accordance with such analysis, whereby a plurality of remote stations may simultaneously be processing the different bits of a given message frame, and said frames including bit means classifying the corresponding frame as a "Dedicated" frame designed to activate a selected remote station and as "Available" frames which can be activated by a remote station, each remote station having means to detect a "Dedicated" frame addressed to said station and to respond thereto and having means to select an "Available" frame to transmit data and operable to actuate the corresponding classifying bit means upon remote station engaging of an "Available" frame and thereby converting said frame into an "Unavailable" frame.

14. In the data connection loop system of claim 13 wherein at least two of said remote stations include means for communication with each other and the loop controller to utilize said "Available" frames and "Dedicated" frames for communication therebetween.

15. The data communication loop system of claim 14 wherein each of said means is a teleprinter unit.

16. In the data communication loop system of claim 13 wherein each of said "Available" frames is further classified as a "Generally Available" frame and an "Assigned Available" frame to establish a priority system of frames.

17. The data communication loop system of claim 13 wherein said plurality of remote stations each includes a plurality of point modules for selectively controlling one or more load means, each of said message frames includes a similar plurality of digital logic bits transmitted in immediately succeeding timed relation divided into four bytes including a first remote station identifying byte for selection of a remote station, a second point module identifying byte for selection of a point module, a third command control byte for establishing a particular function for the load means and a fourth data byte for selection of a particular load means and interchange of data with said load means.

18. The data communication loop system of claim 17 wherein the remote stations include a multiple contact point module for selectively monitoring the contact status.

19. The data communication loop system of claim 17 wherein the remote stations include an analog controller point module for establishing an analog control signal.

20. The data communication loop system of claim 17 wherein the remote stations include an on-off control point module having an on-input and off-input.

21. The data communication loop system of claim 17 wherein the remote stations include a status sensing readout.

22. The data communication loop system of claim 17 wherein the remote stations include an auxiliary point module confirming to EIA standard RD—232—C for selective connection to peripheral equipment.

23. The data communication loop system of claim 17 wherein the remote stations include an analog to digital converter point module.

24. The data communication loop system of claim 17 wherein the remote stations include an analog signal readout module for receiving an analog signal from a remote station.

25. The data communication loop system of claim 13 wherein each remote station includes a message frame handling means including address detecting means for the corresponding station, a plurality of point modules having an address means and a coupler coupled to said frame handling means and including a command response means to establish a corresponding response to a command signal at said coupler, and a common bus means connected to each point module for simultaneous communication including address reading and data interchanging with said loop.

26. The data communication system of claim 25 wherein each of said point modules interconnecting means selectively connecting said point modules to select and fill a message frame in response to creation of a request signal at said point modules, and means interconnecting said point modules to create a sequential operation in response to simultaneous presence of more than one request signal.

27. The data communication loop system of claim 13 wherein each remote station includes a multiple voltage supply means establishing a plurality of operating voltages to the several associated point modules and frame handling means, said voltages being divided into first voltages essential to remote station operations and to second voltages essential to loop communicating, and monitoring means for said voltages and operable to by-pass the remote station in response to a voltage fault in a second voltage and to transmit a fault message to the controller in response to a voltage fault in a first voltage.

28. The communication system of claim 27 wherein each of said monitoring means includes switch means connecting said input cable means directly to said output cable means and responsive to said second voltages to complete the connection.

29. The data communication loop system of claim 13 wherein each remote station includes frame generating means for generating frames with a unique address, and fault locating means responsive to an open loop condition in the signal receiving input of a remote station to actuate said generating means for generating a series of data frames with the corresponding unique address in said generated data frames.

30. The data communication system of claim 29 wherein said loop controller generates said message frames at a selected minimum rate with corresponding spacing quiet periods, said fault locating means includes a timing means responsive to the quiet period between message frames to actuate said generating means, said fault locating means being reset by receipt of a logic message frame bit signal at the station input to reset the timing means and terminate the operation of the generating means.

31. The data communication system of claim 30 wherein each of said remote stations includes means responsive to terminating of frame generation by said generating means to prevent transmission of a message frame including said resetting bit and to transmit only subsequently received message frames following receipt of said resetting frame bit signal.

32. The data communications system of claim 30 wherein said loop controller generates null frames operative for resetting said timing means at said remote stations while preventing data transmission to said loop controller.

33. The data communication loop system of claim 13 wherein one of said remote stations comprises operator console means having a fixed loop address means and means for connecting said console in said loop, said console having an output panel means including visual display means for the several other remote stations and producing a visual display of the station status, said visual display means including a frame responsive means for selectively actuating said display means, and said console having manually operable system input means for requesting a message frame and introducing the console address into such frame.

34. The data communication loop system of claim 33 wherein said console means includes a plurality of data switches operable to introduce preselected data into at least one subsequent "Dedicated" frame.

35. In the loop communication system of claim 34 wherein said system input means include a transmit switch, a clear switch and an acknowledge switch, said transmit switch being operable to transmit the data of said data switches to subsequent "Dedicated"frames to cause said loop controller to select a remote station to be affected and to establish an operation to be performed by such station, said clear switch being operable to clear the display means, said acknowledge switch being operable to change the status display means to an acknowledge state.

36. In the loop communications system of claim 35 wherein said transmit switch is operative to transmit data of said data switches to subsequent "Dedicated" frames for causing modification of said controller operation.

37. The data communication loop system of claim 33 wherein said station visual display means includes an "on" state, an "off" state and an "on-off" state to indicate normal, alarm and console acknowledged conditions.

38. The data communication loop system of claim 33 including an audio intercom system coupled to the remote stations and including an audible alarm responsive to control from the message frames.

39. In the loop communication system of claim 33 wherein said console includes a numeric display means operable from said message frames for presentation of analog information and non-analog functions, separate indicating means operable conjointly with the numeric display means for identifying the function displayed.

40. The data communication system of claim 33 wherein said operator console includes a remote station address of all logic "0" in a message frame, and including a plurality of module addresses for selective coupling to said display means and said input means.

41. A data communication loop system including a central controller generating a series of multiple bit data frames transmitted in serial fashion through the transmission loop to a plurality of remote stations, each of the stations including a selected multiple bit address adapted to be carried within each of said frames, the improvement in an effective open loop detection means comprising a remote station frame generating means within each of said remote stations for generating and inserting a unique address in said data frames, and fault locating means responsive to an open loop condition on the input means to a remote station to actuate said generating means for generating a series of data frames with the corresponding unique address in said generated data frames.

42. The data communication loop system of claim 41 wherein said remote station generating means inserts the corresponding remote station address as said unique address.

43. The data communication system of claim 41 wherein said message frames are generated by the controller at a selected minimum rate with corresponding spacing quiet periods, said fault locating means includes a timing means responsive to the quiet period between message frames to actuate said generating means, said fault locating means being reset by receipt of a logic message frame bit signal at the station input to reset the timing means and terminate the operation of the generating means.

44. The data communication system of claim 43 wherein said remote station being further reset by said bit signal to transmit only subsequently received message frames following receipt of said resetting frame bit signal.

45. A data communication loop system having a communication loop connecting a loop controller to a plurality of remote stations including a multiplicity of voltage supply means for establishing a plurality of operating voltages, said voltages being divided into first voltages essential to remote station operations and to second voltages essential to loop communicating, the improvement wherein the remote stations include a voltage monitoring means for said voltages and operable to by-pass the remote station in response to a voltage fault in a second voltage and to transmit a fault message to the controller in response to a voltage fault in a first voltage.

46. The loop system of claim 45 including an input cable means and an output cable means for receiving and transmitting digital information in serial form, and said monitoring means including switch means connecting said input cable means directly to said output cable means and responsive to said second voltages to complete the connection.

47. A portable operator console for selective connection in a serial loop system including a loop controller and a plurality of remote stations, with communication being established by multiple bit message frames generated by the loop controller, said console comprising an enclosure having loop cable input means and loop cable output means for connecting of the console to a loop cable, said console having a fixed loop address means for response to a message frame, said console having an output panel means including visual display means for the several other stations and for producing a visual station display of the station status, said visual display means including a frame responsive means for selectively actuating said display means, and said console having manually operable means for requesting of message frames and selectively introducing data into a frame for transmission to a remote station through control of said loop controller.

48. The console of claim 45 having a plurality of data switches for introducing data into a message frame.

49. The console of claim 48 having a frame request switch including a transmit switch, a clear switch and an acknowledge switch, said transmit switch being operable to transmit data of said data switches to subsequent assigned frames, said clear switch being operable to clear the visual display means, and said acknowledge switch being operable to change the display means to an acknowledge state.

50. The console of claim 47 wherein said console includes an auxiliary module conforming to EIA Standard RS—232—C for selective connection to peripheral equipment.

* * * * *

UNITED STATES PATENT OFFICE
CERTIFICATE OF CORRECTION

Patent No. 3,845,472 Dated October 29, 1974

Inventor(s) Stuart R. Buchanan, Paul H. Froehling, Gary F. Oman, Thomas W. Huebner It is certified that error appears in the above-identified patent and that said Letters Patent are hereby corrected as shown below:

column 1, line 65, after "status" insert ---sensing---;

column 10, line 49, cancel "informacion" and substitute therefor ---information---; column 10, line 50, cancel "insructs" and substitute therefor ---instructs---; column 11, line 16, cancel "baypassing" and substitute therefor ---bypassing---; column 11, line 38, cancel "hanlding" and substitute therefor ---handling---; column 13, line 25, cancel "in" and substitute therefor ---an---.

Signed and sealed this 6th day of May 1975.

(SEAL)
Attest:

RUTH C. MASON
Attesting Officer

C. MARSHALL DANN
Commissioner of Patents and Trademarks